(12) United States Patent
Bock

(10) Patent No.: US 6,820,923 B1
(45) Date of Patent: *Nov. 23, 2004

(54) SOUND ABSORPTION SYSTEM FOR AUTOMOTIVE VEHICLES

(75) Inventor: Lothar Josef Bock, Dryden, MI (US)

(73) Assignee: L&L Products, Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/631,211

(22) Filed: Aug. 3, 2000

(51) Int. Cl.⁷ .......................... B62D 24/02; B62D 21/15
(52) U.S. Cl. ............................... 296/187.02; 296/39.3; 181/286; 181/294; 181/296; 52/144; 52/794.1; 52/309.4; 52/309.8
(58) Field of Search .............................. 52/144, 309.4, 52/309.8, 309.5, 794.1, DIG. 5, 208; 296/191, 193, 39.1, 39.3, 187, 39.2, 187.02; 428/95, 147, 318.4; 181/284, 286, 290, 291, 294, 295, 296

(56) References Cited

U.S. PATENT DOCUMENTS

| | | |
|---|---|---|
| 1,814,677 A | 7/1931 | Fennema |
| 3,054,636 A | 9/1962 | Wessells, III |
| 3,123,170 A | 3/1964 | Bryant |
| 3,493,257 A | 2/1970 | Fitzgerald et al. |
| 3,649,375 A | 3/1972 | Venkatesan |
| 3,665,968 A | 5/1972 | DePutter |
| 3,746,387 A | 7/1973 | Schwenk |
| 3,757,559 A | 9/1973 | Welsh |
| 3,868,796 A | 3/1975 | Bush |
| 3,888,502 A * | 6/1975 | Felzer et al. ............ 280/106 R |
| 3,890,108 A | 6/1975 | Welsh |
| 4,019,301 A | 4/1977 | Fox |
| 4,029,128 A | 6/1977 | Yamagishi |
| 4,082,825 A | 4/1978 | Puterbaugh |
| 4,083,384 A | 4/1978 | Horne et al. |
| 4,090,734 A | 5/1978 | Inami et al. |
| 4,238,540 A | 12/1980 | Yates et al. |
| 4,378,395 A | 3/1983 | Asoshina et al. |
| 4,397,490 A | 8/1983 | Evans et al. |
| 4,440,434 A * | 4/1984 | Celli .......................... 296/185 |
| 4,451,518 A | 5/1984 | Miura et al. |
| 4,457,555 A | 7/1984 | Draper |
| 4,463,870 A | 8/1984 | Coburn, Jr. et al. |
| 4,559,274 A | 12/1985 | Kloppe et al. |
| 4,598,008 A * | 7/1986 | Vogt et al. .................. 428/117 |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |

(List continued on next page.)

FOREIGN PATENT DOCUMENTS

| | | |
|---|---|---|
| AU | 0 236 291 | 9/1987 |
| DE | 3627725 A1 | 2/1988 |

(List continued on next page.)

OTHER PUBLICATIONS

Copending U.S. application Ser. No. 09/584,211, filed May 31, 2000.
Copending U.S. application Ser. No. 09/655,965, filed Sep. 6, 2000.

(List continued on next page.)

*Primary Examiner*—Phi Dieu Tran A
(74) *Attorney, Agent, or Firm*—Dobrusin & Thennisch PC

(57) ABSTRACT

An automotive vehicle sound absorption system. An expandable material, such as an polymer-based foam, is disposed on a surface of a wall. Upon activation, the foam transforms, preferably during an automobile assembly operation, and remains bonded to surface for sound absorption.

27 Claims, 2 Drawing Sheets

U.S. PATENT DOCUMENTS

| | | | |
|---|---|---|---|
| 4,762,352 A | 8/1988 | Enomoto | |
| 4,769,391 A | 9/1988 | Wycech | |
| 4,803,108 A | 2/1989 | Leuchten et al. | |
| 4,813,690 A | 3/1989 | Coburn, Jr. | |
| 4,836,516 A | 6/1989 | Wycech | |
| 4,853,270 A | 8/1989 | Wycech | |
| 4,861,097 A | 8/1989 | Wycech | |
| 4,867,271 A * | 9/1989 | Tschudin-Mahrer | 181/290 |
| 4,898,630 A | 2/1990 | Kitoh et al. | |
| 4,901,395 A | 2/1990 | Semrau | |
| 4,901,500 A | 2/1990 | Wycech | |
| 4,908,930 A | 3/1990 | Wycech | |
| 4,917,435 A | 4/1990 | Bonnett et al. | |
| 4,922,596 A | 5/1990 | Wycech | |
| 4,923,902 A | 5/1990 | Wycech | |
| 4,946,737 A | 8/1990 | Lindeman et al. | |
| 4,978,562 A | 12/1990 | Wycech | |
| 4,984,406 A | 1/1991 | Friesen | |
| 4,989,913 A | 2/1991 | Moore, III | |
| 4,995,545 A | 2/1991 | Wycech | |
| 5,040,803 A | 8/1991 | Cieslik et al. | |
| 5,072,952 A | 12/1991 | Irrgeher et al. | |
| 5,102,188 A | 4/1992 | Yamane | |
| 5,122,398 A | 6/1992 | Seiler et al. | |
| 5,124,186 A | 6/1992 | Wycech | |
| 5,196,253 A * | 3/1993 | Mueller et al. | 428/138 |
| 5,213,391 A | 5/1993 | Takagi | |
| 5,255,487 A | 10/1993 | Wieting et al. | |
| 5,266,133 A | 11/1993 | Hanley et al. | |
| 5,344,208 A | 9/1994 | Bien et al. | |
| 5,358,397 A | 10/1994 | Ligon et al. | |
| 5,373,027 A | 12/1994 | Hanley et al. | |
| 5,382,397 A | 1/1995 | Turner, Jr. | |
| 5,395,135 A | 3/1995 | Lim et al. | |
| 5,506,025 A | 4/1996 | Otto et al. | |
| 5,544,930 A | 8/1996 | Stedman | |
| 5,560,672 A | 10/1996 | Lim et al. | |
| 5,575,526 A | 11/1996 | Wycech | |
| 5,577,784 A | 11/1996 | Nelson | |
| 5,580,120 A | 12/1996 | Nees et al. | |
| 5,631,027 A | 5/1997 | Takabatake | |
| 5,642,914 A | 7/1997 | Takabatake | |
| 5,648,401 A | 7/1997 | Czaplicki et al. | |
| 5,649,400 A | 7/1997 | Miwa | |
| 5,652,039 A | 7/1997 | Tremain et al. | |
| 5,707,098 A | 1/1998 | Uchida et al. | |
| 5,725,272 A | 3/1998 | Jones | |
| 5,731,069 A | 3/1998 | Delle Donne et al. | |
| 5,755,486 A | 5/1998 | Wycech | |
| 5,766,719 A | 6/1998 | Rimkus | |
| 5,785,376 A | 7/1998 | Nees et al. | |
| 5,786,394 A | 7/1998 | Slaven | |
| 5,803,533 A | 9/1998 | Schulz et al. | |
| 5,804,608 A | 9/1998 | Nakazato et al. | |
| 5,806,915 A | 9/1998 | Takabatake | |
| 5,806,919 A | 9/1998 | Davies | |
| 5,819,408 A | 10/1998 | Catlin | |
| 5,851,626 A | 12/1998 | McCorry et al. | |
| 5,855,094 A | 1/1999 | Baudisch et al. | |
| 5,866,052 A | 2/1999 | Muramatsu | |
| 5,871,849 A | 2/1999 | Lepine | |
| 5,878,784 A | 3/1999 | Sales et al. | |
| 5,884,960 A | 3/1999 | Wycech | |
| 5,885,688 A | 3/1999 | McLaughlin | |
| 5,888,600 A | 3/1999 | Wycech | |
| 5,888,642 A | 3/1999 | Meteer et al. | |
| 5,892,187 A * | 4/1999 | Patrick | 181/286 |
| 5,894,071 A | 4/1999 | Merz et al. | |
| 5,901,528 A | 5/1999 | Richardson | |
| 5,901,752 A | 5/1999 | Lundman | |
| 5,902,656 A | 5/1999 | Hwang | |
| 5,904,024 A | 5/1999 | Miwa | |
| 5,932,680 A | 8/1999 | Heider | |
| 5,934,737 A | 8/1999 | Abouzahr | |
| 5,941,597 A | 8/1999 | Horiuchi et al. | |
| 5,984,389 A | 11/1999 | Nuber | |
| 5,985,435 A | 11/1999 | Czaplicki et al. | |
| 5,988,734 A | 11/1999 | Longo et al. | |
| 5,992,923 A | 11/1999 | Wycech | |
| 5,994,422 A | 11/1999 | Born et al. | |
| 6,003,274 A | 12/1999 | Wycech | |
| 6,004,425 A | 12/1999 | Born et al. | |
| 6,006,484 A | 12/1999 | Geissbuhler | |
| 6,022,066 A | 2/2000 | Tremblay et al. | |
| 6,030,701 A | 2/2000 | Johnson et al. | |
| 6,033,300 A | 3/2000 | Schneider | |
| 6,050,630 A | 4/2000 | Hochet | |
| 6,053,210 A | 4/2000 | Chapman et al. | |
| 6,058,673 A | 5/2000 | Wycech | |
| 6,059,342 A | 5/2000 | Kawai et al. | |
| 6,068,424 A | 5/2000 | Wycech | |
| 6,073,991 A | 6/2000 | Naert | |
| 6,077,884 A | 6/2000 | Hess et al. | |
| 6,079,180 A | 6/2000 | Wycech | |
| 6,082,811 A | 7/2000 | Yoshida | |
| 6,090,232 A | 7/2000 | Seeliger et al. | |
| 6,092,864 A | 7/2000 | Wycech et al. | |
| 6,093,358 A | 7/2000 | Schiewe et al. | |
| 6,094,798 A | 8/2000 | Seeliger et al. | |
| 6,096,403 A | 8/2000 | Wycech | |
| 6,096,791 A | 8/2000 | Born et al. | |
| 6,099,948 A | 8/2000 | Paver, Jr. | |
| 6,102,379 A | 8/2000 | Ponslet et al. | |
| 6,102,473 A | 8/2000 | Steininger et al. | |
| 6,103,341 A | 8/2000 | Barz et al. | |
| 6,103,784 A | 8/2000 | Hilborn et al. | |
| 6,110,982 A | 8/2000 | Russick et al. | |
| 6,129,410 A | 10/2000 | Kosaraju et al. | |
| 6,131,897 A | 10/2000 | Barz et al. | |
| 6,135,542 A | 10/2000 | Emmelmann et al. | |
| 6,146,565 A * | 11/2000 | Keller | 264/46.5 |
| 6,149,227 A | 11/2000 | Wycech | |
| 6,150,428 A | 11/2000 | Hanley, IV et al. | |
| 6,152,260 A * | 11/2000 | Eipper et al. | 181/296 |
| 6,153,709 A | 11/2000 | Xiao et al. | |
| 6,165,588 A | 12/2000 | Wycech | |
| 6,168,226 B1 | 1/2001 | Wycech | |
| 6,174,932 B1 | 1/2001 | Pachl et al. | |
| 6,189,953 B1 | 2/2001 | Wycech | |
| 6,196,621 B1 | 3/2001 | VanAssche et al. | |
| 6,197,403 B1 * | 3/2001 | Brown et al. | 428/137 |
| 6,199,940 B1 | 3/2001 | Hopton et al. | |
| 6,218,442 B1 | 4/2001 | Hilborn et al. | |
| 6,232,433 B1 | 5/2001 | Narayan | |
| 6,233,826 B1 | 5/2001 | Wycech | |
| 6,237,304 B1 | 5/2001 | Wycech | |
| 6,247,287 B1 | 6/2001 | Takabatake | |
| 6,253,524 B1 | 7/2001 | Hopton et al. | |
| 6,263,635 B1 | 7/2001 | Czaplicki | |
| 6,270,600 B1 | 8/2001 | Wycech | |
| 6,272,809 B1 | 8/2001 | Wycech | |
| 6,276,105 B1 | 8/2001 | Wycech | |
| 6,277,898 B1 | 8/2001 | Pachl et al. | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,303,672 B1 | 10/2001 | Papalos et al. | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |

| | | |
|---|---|---|
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,357,819 B1 | 3/2002 | Yoshino |
| 6,368,438 B1 | 4/2002 | Chang et al. |
| 6,372,334 B1 | 4/2002 | Wycech |
| 6,376,564 B1 | 4/2002 | Harrison |
| D457,120 S | 5/2002 | Broccardo et al. |
| 6,382,635 B1 | 5/2002 | Fitzgerald |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,475,577 B1 | 11/2002 | Hopton et al. |
| 6,482,496 B1 | 11/2002 | Wycech |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 2002/0033617 A1 | 3/2002 | Blank |
| 2002/0053179 A1 | 5/2002 | Wycech |
| 2002/0054988 A1 | 5/2002 | Wycech |
| 2002/0074827 A1 * | 6/2002 | Fitzgerald et al. .......... 296/188 |

FOREIGN PATENT DOCUMENTS

| | | | |
|---|---|---|---|
| DE | 38 26 011 A1 | 2/1990 | |
| DE | 40 28 895 C1 | 2/1992 | |
| DE | 196 35 734 A1 | 4/1997 | |
| DE | 196 48 164 A1 | 5/1998 | |
| DE | 198 12 288 C1 | 5/1999 | |
| DE | 197 53 658 A1 | 6/1999 | |
| DE | 299 04 705 U1 | 7/1999 | |
| DE | 198 56 255 C1 | 1/2000 | |
| DE | 198 58 903 A1 | 6/2000 | |
| EP | 588182 * | 9/1993 | ................. 181/294 |
| EP | 0 588 182 A2 | 3/1994 | |
| EP | 0 679 501 A1 | 11/1995 | |
| EP | 0 775 721 A1 | 5/1997 | |
| EP | 1 006 022 A2 | 6/2000 | |
| EP | 1 006 022 B1 | 6/2000 | |
| EP | 1 122 156 A2 | 8/2001 | |
| EP | 0 893 322 B1 | 3/2002 | |
| EP | 1 256 512 A2 | 11/2002 | |
| FR | 2 539 693 | 1/1983 | |
| FR | 2 749 263 | 12/1997 | |
| GB | 2 156 412 A | 10/1985 | |
| GB | 2 375 328 A | 11/2002 | |
| JP | 61118211 | 6/1986 | |
| JP | 01164867 | 6/1989 | |
| JP | 197743 * | 8/1991 | ................. 181/296 |
| JP | 10053156 | 2/1998 | |
| JP | 2001-48055 | 2/2001 | |
| JP | 02001191949 A | 7/2001 | |
| WO | WO 87/01978 | 4/1987 | |
| WO | WO 99/28575 | 6/1999 | |
| WO | WO 99/48746 | 9/1999 | |
| WO | WO 00/03894 | 1/2000 | |
| WO | PCT/EP00/01474 | 2/2000 | |
| WO | PCT/US00/02631 | 2/2000 | |
| WO | PCT/AT00/00123 | 5/2000 | |
| WO | WO 00/37302 | 6/2000 | |
| WO | WO 00/43254 | 7/2000 | |
| WO | WO 00/55444 | 9/2000 | |
| WO | WO 01/30906 | 5/2001 | |
| WO | WO 01/54936 | 8/2001 | |
| WO | WO 01/56845 | 8/2001 | |
| WO | WO 01/57130 | 8/2001 | |
| WO | WO 01/71225 | 9/2001 | |
| WO | WO 01/83206 | 11/2001 | |
| WO | WO 01/88033 | 11/2001 | |

OTHER PUBLICATIONS

Copending U.S. application Ser. No. 09/858,939, filed May 16, 2001.
Copending U.S. application Ser. No. 09/859,126, filed May 16, 2001.
Copending U.S. application Ser. No. 09/906,289, filed Jul. 16, 2001.
Copending U.S. application Ser. No. 09/923,138, filed Aug. 6, 2001.
Copending U.S. application Ser. No. 09/939,152, filed Aug. 24, 2001.
Copending U.S. application Ser. No. 09/939,245, filed Aug. 24, 2001.
Copending U.S. application Ser. No. 09/974,017, filed Oct. 10, 2001.
Copending U.S. application Ser. No. 09/982,681, filed Oct. 18, 2001.
Copending U.S. application Ser. No. 60/296,312, filed Jun. 6, 2001.
Copending U.S. application Ser. No. 60/317,009, filed Sep. 4, 2001.
Klein, M. and Adam Opel AG, "Application of Structural Foam in the Body in White–Reinforcement Roof Rail Side of the OPEL ASTRA", VDI Berichte NR, pp. 227–250.
International Search Report dated Jan. 2, 2002.
Written Opinion dated Feb. 11, 2002.
International Preliminary Examination Report dated May 8, 2002.

* cited by examiner

US 6,820,923 B1

SOUND ABSORPTION SYSTEM FOR AUTOMOTIVE VEHICLES

FIELD OF THE INVENTION

The present invention relates generally to improving sound absorption in an automotive vehicle. More particularly, the invention relates to an automotive vehicle space frame system of that is coated over a portion of its surface with an expandable sound absorbing material, to improve the sound absorption characteristics of the automotive vehicle by the reduction of airborne noise propagating throughout the frame cavities.

BACKGROUND OF THE INVENTION

For many years the transportation industry has been concerned with designing hollow structural or other members that do not transmit or amplify noise from one portion of the vehicle to another, while also not adding significantly to the weight of the vehicle. One such technique has been to employ baffle structures, within hollow cavities of the space frame construction, for effectively blocking sound waves traveling through the sheet metal cavities. For instance, one popular technique has employed a baffle substrate that is coated or edged with a thermally polymeric material, which upon heat activation expands and fills the space defined between the substrate and a wall of the member. While these prior art devices perform well and are advantageous in many circumstances, they often require that the baffle substrate be shaped according to a predetermined configuration, which is generally dictated by the structure of particular sheet metal surroundings. In turn, this requires the manufacture of particular tooling for producing the substrate, which adds potential cost and delay, particularly if changes to the vehicle structure are implemented during the design stages. Accordingly, there is need for a simple low cost system that permits consistent and reproducible noise absorption within the vehicle cavities, and which can be employed across a wide range of different sizes or shapes of cavities.

SUMMARY OF THE INVENTION

The present invention is directed to a sound absorption system, and particularly one for automotive vehicle space frame structures, such as (without limitation) vehicle roofrails and pillar structures. The system generally employs a substrate that is coated, over at least a portion of its surface, with a sound absorbing medium, and particularly a heat activated resinous sound absorption material. In a particular preferred embodiment, the substrate is an inner wall of a metal, plastic or composite vehicle body member, and it is at least partially coated with a heat activated polymer, (e.g., a formable hot melt adhesive based polymer or an expandable structural foam, examples of which include olefinic polymers, vinyl polymers, thermoplastic rubber-containing polymers, epoxies, urethanes or the like).

In one embodiment the sound absorption medium is placed on or adjacent one or more inner walls defining a cavity within an automotive vehicle space frame, such as a vehicle roof rails, pillars, rockers or otherwise. The sound absorption medium is activated to accomplish transformation (e.g., expansion or flow) of the polymer within the cavity. The resulting structure includes a wall that is coated over at least a portion of its surface with the sound absorption medium pursuant to which anachonic chamber principles are employed for sound management.

DETAILED DESCRIPTION OF THE DRAWINGS, FOTOS

The features and inventive aspects of the present invention will become more apparent upon reading the following detailed description, claims, and drawings, of which the following is a brief description:

DETAILED DESCRIPTION OF PREFERRED EMBODIMENT

Figure 1:
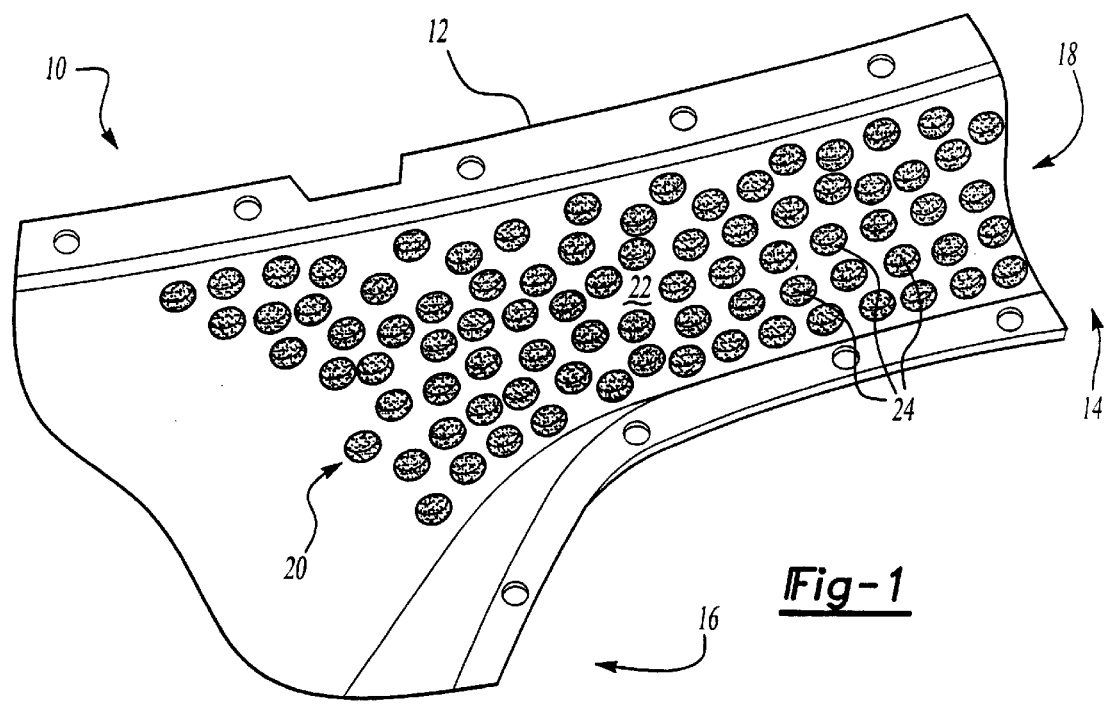
FIG. 1 is a cutaway plan view of a vehicle sidewall coded with a sound absorption material in accordance with the present invention prior to activation of the material.

FIG. 1 illustrates an example of an automotive vehicle showing portions of a space frame structure 10. As will be appreciated, it is common for such structures to include a multitude of hollow-portioned vehicle space frame members that are joined to define the vehicle body, within which there are cavities. One such structure, for purposes of illustration (without limitation) is a vehicle pillar structure 12. As will be recognized, associated with the pillar structure may also be roof members, windows, sunroofs or other removable tops, vehicle doors and door components, sub-frame construction, or the like. Other vehicle body members for example (plastics/metals (e.g., steel, aluminum (magnesium based) or the like) are also contemplated as being treated in accordance with the present invention.

Any of the vehicle pillars (e.g., A, B, C or D) may be treated in accordance with the present invention. In FIG. 1 there is shown also a portion of the pillar structure 12 that bridges at a first end 14, the vehicle roof, and at its second end 16, the frame or other structure defining the passenger compartment. As illustrated in the cutaway view of FIG. 1, the pillar has a hollow portion and it is generally tubular, with any suitable cross sectional configuration or reinforcements.

Sound absorption of the roof rail and pillar sections is accomplished according to the present invention by locating one or a multitude of an appropriate pattern 18 of a sound absorption material 20 of the type discussed herein within a hollow or cavity portion of the roof rail or pillar, and more preferably by coating such material over at least a portion of a wall 22 defining the hollow or cavity portion. FIG. 1 illustrates examples of this by showing a first pattern 18 in one location. The sound absorption material 20 preferably is fixedly secured to at least one such wall by one of its own external surfaces. Accordingly, it is preferred that the sound absorption material is a polymeric foam that includes a bonding component, which maintains it in place on the wall defining the cavity, and thereafter, upon heat activation maintains its adhesion to the wall but expands to form a foam within the hollow cavity. Thus preferably the sound absorption material is a heat-activated material having an adhesive component.

Though other heat-activated materials are possible, a preferred heat activated material is an expandable or flowable polymeric formulation, and preferably one that is foamable. A particularly preferred material is an olefinic polymer-based acoustic foam, and more particularly an ethylene based polymer. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, etc.

A number of other suitable materials are known in the art and may also be used for noise attenuation. One such foam preferably includes an open-cell polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the acoustical foam is usually initially processed as a flowable thermoplastic material before curing. It will cross-link upon curing, which makes the material resistant of further flow or change of final shape.

One advantage of the preferred sound absorption materials 14 is that the preferred materials can be processed in several ways, thereby affording substantial design and production flexibility. For instance, without limitation, the preferred materials can be processed by injection molding, extrusion, compression molding, in a pumpable medium, or with a mini-applicator. This enables the formation and creation of acoustical shaping that exceed the capability of most prior art materials. In one preferred embodiment, the foam (in its uncured state) generally is dry or relatively free of tack to the touch. In another embodiment, upon application to a surface and prior to curing, the material is tacky, but thereafter becomes dry or relatively free of tack to the touch. In yet another embodiment, the material remains tacky throughout processing.

While the preferred materials for fabricating the sound absorption material have been disclosed, the material can be formed of other materials (e.g., foams regarded in the art as structural foams) provided that the material selected is heat-activated or otherwise activated by an ambient condition (e.g. moisture, pressure, time or the like) and cures in a predictable and reliable manner under appropriate conditions for the selected application. One such material is the polymeric based resin disclosed in commonly owned, U.S. patent application Ser. No. 09/268,810 (filed Mar. 8, 1999), the teachings of which are incorporated herein by reference.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/U.S. Pat. No. 99/24795) (all of which are expressly incorporated by reference). In general, the desired characteristics of the resulting foam include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes.

In this regard, in applications where a heat activated, thermally expanding material is employed as the sound absorption material, a consideration involved with the selection and formulation of the material comprising the acoustical foam is the temperature at which a material reaction or expansion, and possibly curing, will take place. For instance, in most applications, it is undesirable for the material to be reactive at room temperature or otherwise at the ambient temperature in a production line environment. More typically, the material becomes reactive at higher processing temperatures, such as those encountered in an automobile assembly plant, when the material is processed along with the vehicle components at elevated temperatures or at higher applied energy levels, e.g., during E-coat preparation steps. While temperatures encountered in an automobile e-coat operation may be in the range of about 145° C. to about 210° C. (about 300° F. to 400° F.), primer, filler and paint shop applications are commonly about 93.33° C. (about 200° F.) or higher. The material is thus operative throughout these ranges. If needed, blowing agent activators can be incorporated into the composition to cause expansion at different temperatures outside the above ranges.

Generally, suitable expandable foams have a range of expansion ranging from approximately 0 to over 1000 percent. The level of expansion of the acoustical foam 14 may be increased to as high as 1500 percent or more. The material may be expandable to a degree (or otherwise situated on a surface) so that individual nodes remain separated from one another upon expansion, or they may contact one another (either leaving interstitial spaces or not).

In another embodiment, the sound absorption material is provided in an encapsulated or partially encapsulated form, for instance an expandable foamable material is encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

Moreover, the sound absorption material may include a melt-flowable material such as that disclosed in U.S. Pat. No. 6,030,701 (expressly incorporated by reference).

Figure 2:
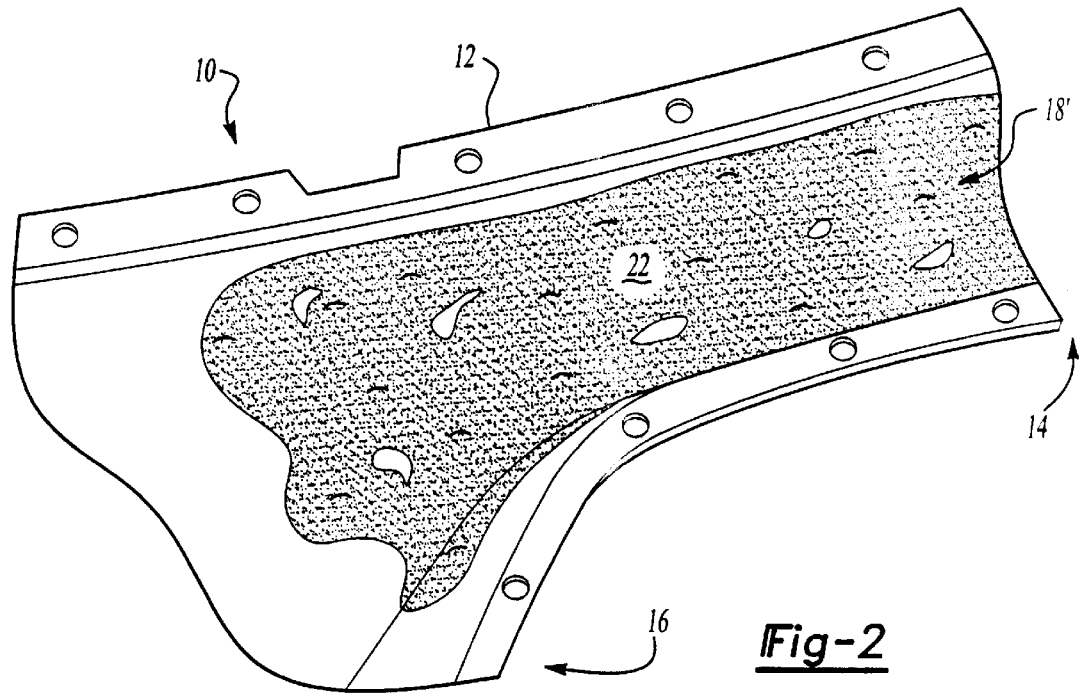
FIG. 2 is a cutaway plan view of a vehicle sidewall coded with a sound absorption material in accordance with the present invention after activation of the material.

Referring again to FIG. 1, there is shown one example of a first pattern 18 for the sound absorption material applied to a vehicle inner surface prior to foaming. FIG. 2 illustrates the same pattern 18' after foaming. As seen, at the outset (and preferably after foaming, the pattern preferably contains a plurality of nodes 24 (illustrative ones designated by the reference numeral 24) of the sound absorption material 20, in accordance with the present invention. Depicted in FIGS. 1 and 2, the nodes 24 are generally disposed in a random pattern, with the relative size of the nodes varying across the wall 22. The random node size and location is particularly suitable for applications where a fairly broad range of sound frequencies with varying amplitudes is to be anticipated. Without intending to be bound by theory, the random size and location helps to address all common frequencies ranges generated by the vehicle or its components including road induced noise and absorb the same.

The skilled artisan will appreciate that the pattern of FIGS. 1 and 2 is but one of many patterns that may be employed. In one preferred embodiment, such patterns and the selection of the material is made for achieving generally miniaturized anachonic chamber areas, where it is believed that acoustical energy from sound waves is transformed into thermal energy, which can be dissipated through the sound absorption material on to the carrier material to the surrounding medium.

It is believed possible to achieve like results by the use of repeating random patterns, repeating similar patterns (e.g., with nodes of a generally constant size, shape or both), or a combination of these patterns. In this regard, tuning of the characteristics of an overall pattern for achieving absorption of certain preselected noises is also possible. Shown in FIG. 1, prior to foaming the nodes are generally circular and discrete. This is not intended as limiting, as like results may also be achieved by using nodes of any suitable shape. Moreover, the nodes may be substituted or combined with other geometries of the sound absorption material, including linear geometry, arcade geometry, angular geometry (e.g. zig zags, polygons, or mixtures thereof) or combinations thereof. Both the nodes and the patterns into which they are assimilated may be continuous, isolated or segregated or a combination thereof, across a surface to which they are applied. It is also contemplated that a sheet or tape of the sound absorption material may be made; having a desired pattern removed therefrom, such as by die cutting or injection molding. The pattern may also be defined by a topology of a continuous surface of the sound absorption material. One or more patterns may be employed for any given region of a vehicle frame. The patterns may be intermittently located along the region or selectively located in a predetermined location. They may be continuous, discrete with interstitial spaces, or continuous with interspersed interstitial gaps.

The wall 22 defining the cavity of the frame may be any suitable material such as metallic, plastic, plastic composite, or the like. It may be coated prior to, during or after application of the sound absorption material.

In one embodiment of the present invention, though other sequences may be employed, the sound absorption material is applied to the surface of a wall defining a vehicle cavity prior to vehicle priming and painting. One advantage of the system of the present invention is the flexibility in design afforded by the use of patterns of sound absorption material as described herein. In many instances, the selection of a particular pattern is not dependent upon the geometry of the cavity into which the pattern is placed. Thus, there is no need to manufacture support structures such as baffles (as in the prior art). Moreover, excess material can be readily used in the manufacture of subsequent vehicles of the same or different body type.

Figure 3:
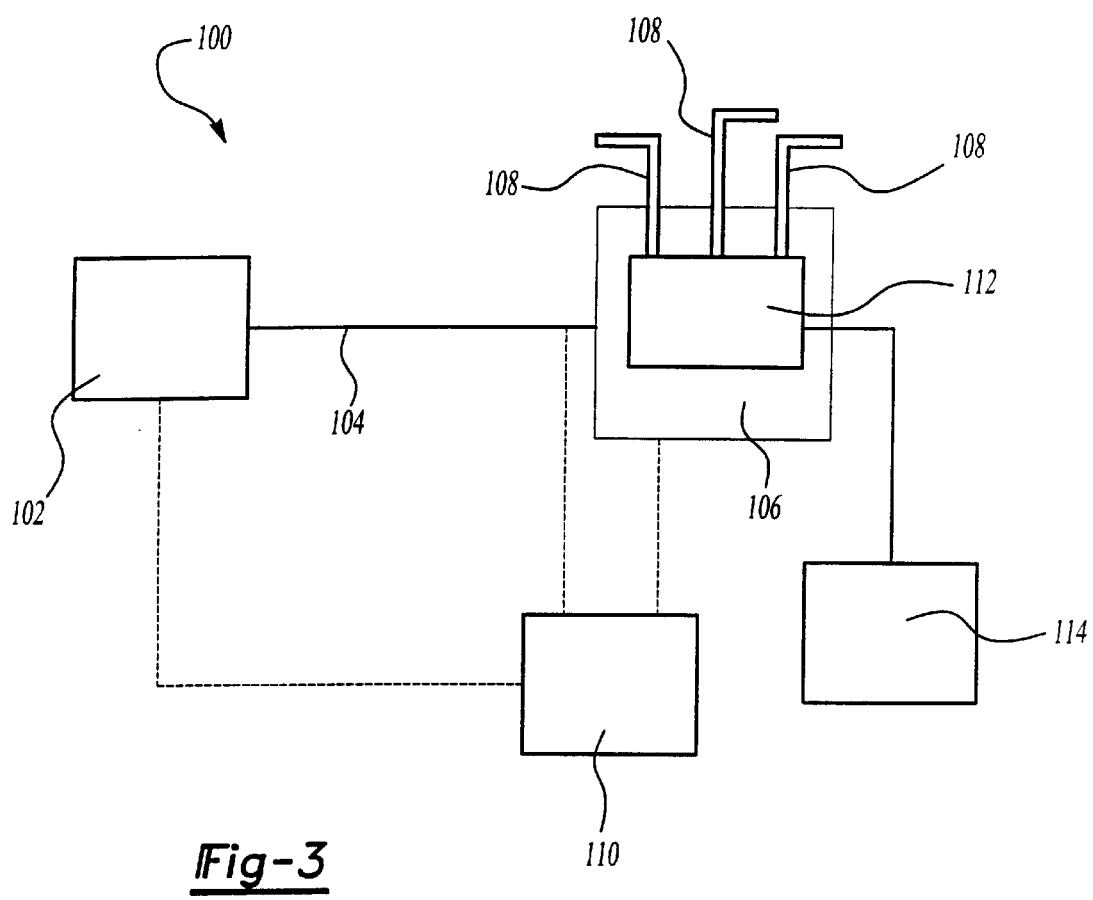
FIG. 3 is a schematic of a system for making structures in accordance with the present invention.

In one preferred method in accordance with the present invention, the nodes are individually prepared, dispensed and applied to the vehicle frame at the site of the vehicle frame. Of course, it is also possible to prepare the nodes, dispense them or both at a remote location. By way of illustration, referring to FIG. 3, it is envisioned that a dispensing system 100 in accordance with the present invention will include a container 102 for the material, and preferably one which is heatable above the softening point (and more preferably above the melting point) of the sound absorption material, but preferably below its foaming activation temperature. The container is in suitable fluid communication (e.g. through a conduit arrangement 104) with a dispenser 106 having one or a multitude of dispensing nozzles 108 (which may be of suitable tip size and configuration for achieving the desired shape of the node or pattern). Heat can be applied to the material at one or more suitable locations to render it sufficiently fluid for transport from the container to and through the dispensing nozzles 108. Transport can be effected in any suitable manner for driving sound absorption material in its fluidic state through the dispensing system. For instance, a suitable pump 110 (such as a gear pump) may by employed for pumping the material. Screw feeding devices or the like may be used as well. A miniaturized extrusion system may also be suitably employed.

In addition, as discussed previously, preformed patterns may also be employed such as those made by extruding a sheet (having a flat or contoured surface) and then die cutting it according to a predetermined configuration.

The actual application of the nodes or patterns to a surface may be done in any suitable manner, and may be done manually, or through the use of semi-automated or automated systems. In one illustrative embodiment, a nozzle of the dispensing system is further associated with (such as by connecting it to) a robot device 112, preferably capable of moving in at least two axes. The robot arm is in controlling communication with a central processing unit 114 that is appropriately programmed for signaling the robot arm to move to a specified location and to dispense the sound absorption material. In this manner, a particular node or pattern can be reproducibly dispensed in generally the same location from one vehicle to the next. Moreover, preferably the processor 114 is programmed with one or a plurality of different nodes and patterns for one or a multitude of different vehicles. Alternatively, the dispensing system includes a plurality of individual dispensing nozzles, each associated with its own processor for controlling dispensing for a specific vehicle.

The above is not intended as limiting of the manner of dispensing and applying the sound absorption material to a surface. Any suitable application may be employed, including but not limited to spraying, brushing, dipping, adhering, dabbing, swabbing, or the like, taking into account further processing (such as heating or dispersing in a fluid medium) to render the material of suitable viscosity for the operation.

The size of any nodes is not critical. However, for typical applications where the cavity to be filled has an average transverse cross sectional area between about 2 to about 500 square centimeters, where the nodes are generally circular (not limited to this shape), the nodes will have a range of diameters prior to expansion from about 0.1 to about 3 cm, and more preferably about 0.2 to about 1 cm. The diameters may be evenly distributed across the range or concentrated as desired in certain portions of the range. Of course, larger or smaller diameters may be employed. Moreover, in one embodiment, the nodes are individually positioned from one another prior to expansion sufficiently to enable some lateral expansion of the node to fill a portion of the space between the nodes prior to expansion. Thus they may be applied contacting one another, spaced apart from one another or a combination thereof across a pattern. By way of example, the expandable material is shown in its expanded state in FIG. 2. In this manner, it is possible to have an ultimate pattern (i.e. after expansion that covers some or the entirety of a wall surface, with or without intermittent exposed portions of the wall. The topography of the exposed resulting foamed material preferably is an irregular surface including a plurality of curved surfaces across the member of varying heights shape and thickness relative to the wall.

The skilled artisan will appreciate that the use of the sound absorption system disclosed herein is not intended as being limited only to illustrate the locations shown in FIG. 1. They can be used in any location within an automotive vehicle. For instance, other reinforced locations are also possible including but not limited to pillar to door regions, roof to pillar, mid-pillar, roof rails, windshield or other window frames, deck lids, hatches, removable top to roof locations, other vehicle beltline locations, motor rails, lower sills, cross members, lower rails, rockers, side and cross members, vehicle roofs, luggage racks and the like.

Moreover, the skilled artisan will appreciate that the sound absorption system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference). Vehicle rooftops may be reinforced to support additional loads in accordance with the present invention. In the same manner as was described above in the context of a roof and pillar system, a reinforcement frame member (such as a plastic, metal or composite member, which may be porous or densified, (e.g., molded thermoplastic or thermoset; worked or foamed metal such as steel, aluminum, titanium or magnesium; or the like) either with or without an expandable material thereon is placed in a cavity defined in the vehicle frame structure. The material is expanded to help secure the noise attenuation device in place.

As mentioned previously, the present invention is not confined to improving the sound absorption characteristics of vehicle roofs or pillar members. Rather, sound absorption may be improved in any application where a hollow member, or other wall having a concealed surface is employed, including but not limited to rockers, side members, cross rails, longitudinal rails, sills, doors, fuel filler compartments, vehicle space frame members, chassis components, or the like. The sound absorption material of the present invention may also be employed over members having one or more exposed surfaces, such as vehicle wheel wells, undercarriage panels, deck lids, trunk walls, spare tire wells, engine compartments, hoods, or the like. The system may also be employed in the tuning of a vehicle sound system, such as with speaker or subwoofer housings.

A number of advantages are realized in accordance with the present invention, including but not limited to the ability to manufacture a single vehicle assembly without the need for multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A sound absorption system for an automotive vehicle, comprising:
   (a) an automotive vehicle frame having at least one wall, said at least one wall at least partially defining a cavity within said automotive vehicle; and
   (b) a plurality of nodes of an expandable acoustical material in bonding contact over at least a portion of said at least one wall, said plurality of nodes including at least five nodes discretely spaced apart from each other in non-contacting relation, said plurality of nodes varying in size relative to each other across said at least one wall, each node of said plurality of nodes spaced at varying distances from adjacent nodes of the plurality of nodes, wherein, upon exposure to temperatures in the range of about 145° C. to about 210° C.:
      i) said plurality of nodes undergo expansion;
      ii) said plurality of nodes expand away from the at least one wall and toward each other such that the plurality of nodes combine together to form a mass, said mass providing an exposed surface that is partially formed from each of the plurality of nodes;
      iii) said exposed surface of said mass having an irregular topography with curved surfaces of varying heights and shapes; and
      iv) a substantial portion of the exposed surface does not contact any portion of said automotive vehicle to allow said mass to absorb sound of variable frequencies.

2. The system as claimed in claim 1 wherein said plurality of nodes is applied to said at least one wall with an extrusion based mini-applicator.

3. The system as claimed in claim 1 wherein said nodes of said plurality of nodes are generally polygonal.

4. The system as claimed in claim 1 wherein upon expansion, said nodes are adapted for managing sound by anachonic chamber principles.

5. The system as claimed in claim 1 wherein said expandable material is relatively free of tack to the touch prior to expansion.

6. The system as claimed in claim 1 wherein said expandable material includes an ethylene polymer.

7. The system as claimed in claim 1 wherein said plurality of nodes are positioned upon said at least one wall with a miniature extruder.

8. The system as claimed in claim 1 wherein said at least one wall is coated.

9. The system as claimed in claim 1 wherein said at least one wall is formed of a metal material that is at least one of steel, aluminum and magnesium.

10. The system as claimed in claim 1 wherein the at least one wall of the vehicle frame is part of at least one of a vehicle roof rail or an automotive pillar structure.

11. The system as claimed in claim 1 wherein the plurality of nodes expand to greater than 1000% of their original size.

12. A sound absorption system for an automotive vehicle, comprising:
   (a) an automotive vehicle frame for defining a roof-rail and pillar of an automotive vehicle, said frame including at least one wall, said at least one wall at least partially defining a cavity within said automotive vehicle, said at least one wall formed substantially entirely of a metal material; and
   (b) a plurality of nodes of an expandable acoustical material in bonding contact over at least a portion of said at least one wall, said plurality of nodes being discretely spaced apart from each other in non-contacting relation and each node of the plurality of nodes being generally circular, each node of said plurality of nodes spaced at varying distances from adjacent nodes of the plurality of nodes and each node of said plurality of nodes having a diameter from about 0.1 cm to about 3.0 cm wherein, upon exposure to temperatures in the range of about 145° C. to about 210° C.:
      i) said plurality of nodes undergo expansion
      ii) said plurality of nodes expand away from the at least one wall and toward each other such that the plurality of nodes combine together to form a mass, the plurality of nodes expanding to greater than 1000% of their original size, said mass providing an exposed surface that is partially formed from each of the plurality of nodes;
      iii) said exposed surface of said mass having an irregular topography with curved surfaces of varying heights and shapes;
      iv) a substantial portion of the exposed surface does not contact any portion of said automotive vehicle to allow said mass to absorb sound of variable frequencies; and
      v) upon expansion, said nodes of said plurality of nodes are adapted for managing sound by anachonic chamber principles.

13. The system as claimed in claim 12 wherein said plurality of nodes is applied to said at least one wall with an extrusion based mini-applicator.

14. The system as claimed in claim 13 wherein said nodes of said plurality of nodes are generally polygonal.

15. The system as claimed in claim 14 wherein said expandable material is relatively free of tack to the touch prior to expansion.

16. The system as claimed in claim 15 wherein said expandable material includes an ethylene polymer.

17. The system as claimed in claim 12 wherein said plurality of nodes are positioned upon said at least one wall with a miniature extruder.

18. The system as claimed in claim 12 wherein said at least one wall is coated.

19. The system as claimed in claim 12 wherein said metal material is at least one of steel, aluminum and magnesium.

20. A sound absorption system for an automotive vehicle, comprising:

(a) an automotive vehicle frame for defining a roof-rail and pillar of an automotive vehicle, said frame including at least one wall, said at least one wall at least partially defining a cavity within said automotive vehicle, said at least one wall formed substantially entirely of a metal material, said at least one wall being part of at least one of an A-pillar, a B-pillar, a C-pillar, a hood and a decklid of the automotive vehicle; and (b) a plurality of nodes of an expandable acoustical material in bonding contact over at least a portion of said at least one wall, said plurality of nodes including at least five nodes discretely spaced apart from each other in non-contacting relation and each node of the plurality of nodes being generally circular and each node of the plurality of nodes having a range of diameters from about 0.1 cm to about no greater than 3.0 cm and each node of said plurality of nodes spaced at varying distances from adjacent nodes of the plurality of nodes wherein, upon exposure to temperatures in the range of about 145° C. to about 210° C.:

i) said plurality of nodes undergo expansion;
ii) said plurality of nodes expand away from the at least one wall and toward each other such that the plurality of nodes combine together to form a mass, said mass providing an exposed surface that is partially formed from each of the plurality of nodes;
iii) said exposed surface of said mass having an irregular topography with curved surfaces of varying heights and shapes;
iv) a substantial portion of the exposed surface does not contact any portion of said automotive vehicle to allow said mass to absorb sound of variable frequencies; and
v) upon expansion, said nodes of said plurality of nodes are adapted for managing sound by anachonic chamber principles.

21. The system as claimed in claim 20 wherein said nodes of said plurality of nodes are generally polygonal.

22. The system as claimed in claim 20 wherein upon expansion, said nodes are adapted for managing sound by anachonic chamber principles.

23. The system as claimed in claim 20 wherein said expandable material is relatively free of tack to the touch prior to expansion.

24. The system as claimed in claim 20 wherein said expandable material includes an ethylene polymer.

25. The system as claimed in claim 20 wherein said at least one wall is coated.

26. The system as claimed in claim 20 wherein said metal material is at least one of steel, aluminum and magnesium.

27. The system as claimed in claim 20 wherein the plurality of nodes expand to greater than 1000% of their original size.

* * * * *